(12) United States Patent
Chen et al.

(10) Patent No.: US 12,399,497 B2
(45) Date of Patent: Aug. 26, 2025

(54) METHOD FOR PREVENTING A ROBOT FROM COLLIDING WITH ANOTHER ROBOT

(71) Applicant: URSrobot AI Inc., Taipei (TW)

(72) Inventors: Chien-Tung Chen, Taipei (TW); Chung-Hou Wu, Taipei (TW); Chao-Cheng Chen, Taipei (TW); Yi-Jin Lin, Taipei (TW); Dien-Lin Tsai, Taipei (TW)

(73) Assignee: URSrobot AI Inc., Taipei (TW)

( * ) Notice: Subject to any disclaimer, the term of this patent is extended or adjusted under 35 U.S.C. 154(b) by 344 days.

(21) Appl. No.: 18/176,404

(22) Filed: Feb. 28, 2023

(65) Prior Publication Data

US 2023/0280752 A1    Sep. 7, 2023

(30) Foreign Application Priority Data

Mar. 3, 2022  (TW) .................................. 111107668

(51) Int. Cl.
*G05D 1/00* (2024.01)

(52) U.S. Cl.
CPC ......... *G05D 1/0214* (2013.01); *G05D 1/0238* (2013.01); *G05D 1/0246* (2013.01)

(58) Field of Classification Search
USPC ............................... 700/245–264; 701/23–28
See application file for complete search history.

(56) References Cited

U.S. PATENT DOCUMENTS

| | | | | |
|---|---|---|---|---|
| 9,829,333 B1* | 11/2017 | Calder | ................... | G06Q 10/08 |
| 10,037,689 B2* | 7/2018 | Taylor | .................. | G05D 1/0285 |
| 10,133,276 B1* | 11/2018 | Shydo, Jr. | ............ | G05D 1/0248 |
| 11,086,336 B1* | 8/2021 | Bolotski | .............. | G05D 1/0212 |
| 11,126,944 B1* | 9/2021 | Aggarwal | ............. | G06F 9/4887 |
| 11,179,849 B1* | 11/2021 | Ben-Ezra | ................ | B25J 9/1653 |
| 11,232,391 B1* | 1/2022 | Baalke | ............... | G01C 21/3688 |
| 11,769,121 B2* | 9/2023 | Cupersmith | ........... | B25J 13/006 |
| | | | | 700/246 |
| 2002/0111988 A1* | 8/2002 | Sato | ....................... | B25J 9/1676 |
| | | | | 709/217 |
| 2004/0068348 A1* | 4/2004 | Jager | .................... | G05D 1/0295 |
| | | | | 700/255 |
| 2008/0193009 A1* | 8/2008 | Sonoura | .................... | G01S 5/12 |
| | | | | 342/450 |

(Continued)

FOREIGN PATENT DOCUMENTS

WO    WO-2019140126 A1 *  7/2019  ............. G01B 21/18

OTHER PUBLICATIONS

Search Report appended to an Office Action, which was issued to Taiwanese counterpart application No. 111107668 by the TIPO on Jul. 29, 2022, with an English translation thereof (2 pages).

*Primary Examiner* — Jonathan L Sample
(74) *Attorney, Agent, or Firm* — HSML P.C.

(57) ABSTRACT

A method for preventing a robot from colliding with another robot that is provided with an identifying image includes steps of: controlling the robot to move along a predetermined path; stopping the robot when it is determined that a first image captured by the robot while the robot is moving contains the identifying image; and controlling the robot to resume moving along the predetermined path when it is determined that a second image captured by the robot while the robot is not moving does not contain the identifying image.

7 Claims, 4 Drawing Sheets

(56) References Cited

U.S. PATENT DOCUMENTS

| | | | | |
|---|---|---|---|---|
| 2014/0277691 | A1* | 9/2014 | Jacobus | B66F 9/24 |
| | | | | 700/216 |
| 2016/0259342 | A1* | 9/2016 | High | B60P 3/06 |
| 2017/0097232 | A1* | 4/2017 | Anderson-Sprecher | ................... |
| | | | | B25J 5/007 |
| 2018/0079085 | A1* | 3/2018 | Nakata | G05D 1/024 |
| 2019/0061161 | A1* | 2/2019 | Higuchi | G05D 1/0891 |
| 2019/0369642 | A1* | 12/2019 | Watabe | G05D 1/0297 |
| 2020/0050206 | A1* | 2/2020 | Deyle | G01S 13/876 |
| 2020/0089237 | A1* | 3/2020 | Whitaker | G05D 1/0234 |
| 2020/0198122 | A1* | 6/2020 | Newman | B25J 19/023 |
| 2021/0046650 | A1* | 2/2021 | Deyle | G05D 1/0214 |
| 2021/0046655 | A1* | 2/2021 | Deyle | B25J 9/1664 |
| 2021/0287467 | A1* | 9/2021 | Yang | G06F 3/147 |
| 2021/0323800 | A1* | 10/2021 | Liu | B65G 1/0485 |
| 2021/0349473 | A1* | 11/2021 | Akiona | G05D 1/225 |
| 2023/0168679 | A1* | 6/2023 | Brooks | B62B 5/0069 |
| | | | | 701/26 |

\* cited by examiner

METHOD FOR PREVENTING A ROBOT FROM COLLIDING WITH ANOTHER ROBOT

CROSS-REFERENCE TO RELATED APPLICATION

This application claims priority of Taiwanese Invention Patent Application No. 111107668, filed on Mar. 3, 2022.

FIELD

The disclosure relates to a method for preventing a robot from colliding with another robot.

BACKGROUND

Conventionally, an infrared sensor, a laser rangefinder, or the like is utilized to detect an obstacle, so as to prevent the robot from colliding into the obstacle. Due to constraints on detection (e.g., blind spot(s) and limited sensitivity of a sensor), such approach of collision avoidance may work well for a static obstacle (i.e., an obstacle that does not move) such as a tree, but not so for a dynamic obstacle (i.e., an obstacle that moves) such as another moving robot. Moreover, speed of the collision prevention procedure is important in view of the limited response time upon detecting a dynamic obstacle.

SUMMARY

Therefore, an object of the disclosure is to provide a method for preventing a robot from colliding with another robot.

According to the disclosure, said another robot is provided with an identifying image. The robot includes a driving device for driving the robot to move, an image capturing device, a storage device that stores a predetermined path, and a processor that is electrically connected to the driving device, the image capturing device and the storage device. The method is to be implemented by the processor and includes steps of:
  controlling the driving device to drive the robot to move along the predetermined path;
  while the robot is moving, controlling the image capturing device to capture a first image and determining whether the first image that is currently captured by the image capturing device contains the identifying image on said another robot;
  when it is determined that the first image contains the identifying image, controlling the driving device to stop the robot;
  after controlling the driving device to stop the robot, controlling the image capturing device to capture a second image and determining whether the second image that is currently captured by the image capturing device contains the identifying image; and
  when it is determined that the second image does not contain the identifying image, controlling the driving device to drive the robot to resume moving along the predetermined path.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
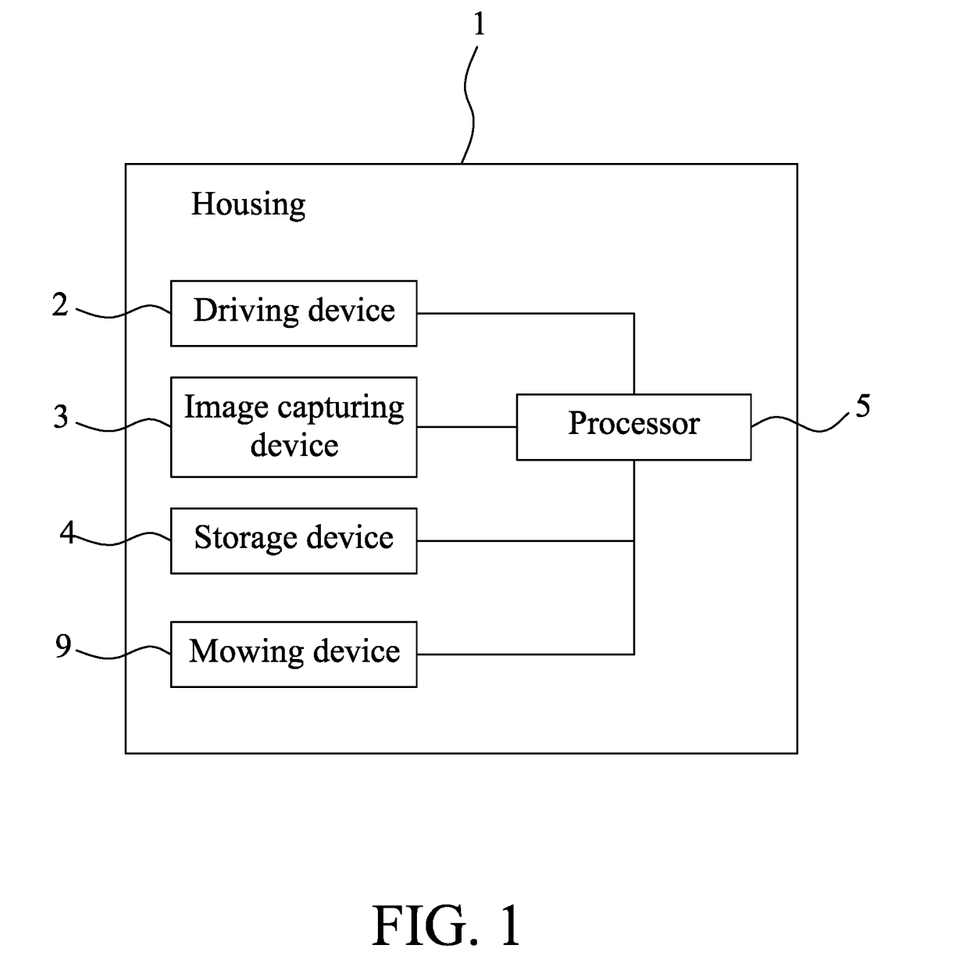
FIG. 1 is a block diagram illustrating an example of a robot according to an embodiment of the disclosure.

A method for preventing a robot from colliding with another robot according to the disclosure is implemented by a plurality of robots that are similar to one another. FIG. 1 illustrates an embodiment of one of the robots, and only one robot will be described as an example in the following description for the sake of brevity.

The robot is provided with an identifying image related to a unique identification code. Particularly, the identifying image is positioned at a front side of the robot, where the front side is defined as a side facing a moving direction of the robot. The identifying image of the robot is to be identified by another robot that faces the front side of the robot. The identifying image may be implemented by a linear barcode or a matrix (or two-dimensional) barcode that encodes the identification code, an ArUco marker or an AprilTag that is used to obtain the identification code from a library, or a pattern that is a visual representation of the identification code (e.g., if the identification code is "01", the pattern would say "01"). However, implementation of the identifying image is not limited to what are disclosed herein and may vary in other embodiments. The robot may be implemented to be a robotic lawn mower, a sweeping robot, a robot vacuum cleaner, a warehouse robot, an inventory robot, a delivery robot, etc., but is not limited to what are disclosed herein and may vary in other embodiments.

The robot includes a driving device 2 for driving the robot to move, an image capturing device 3, a storage device 4, and a processor 5 that is electrically connected to the driving device 2, the image capturing device 3 and the storage device 4. The robot further includes a housing 1 for accommodating the driving device 2, the image capturing device 3, the storage device 4 and the processor 5.

In one embodiment where the robot is implemented to be a robotic lawn mower, the robot further includes a mowing device 9 that is electrically connected to the processor 5 and that is disposed in the housing 1.

In one embodiment where the robot is implemented to be a sweeping robot or a robot vacuum cleaner, the robot may further include a sweeper, a suctioning device and a dust bag.

The driving device 2 may be implemented by a motor.

The image capturing device 3 is configured to be controlled by the processor 5 to repeatedly capture images. The image capturing device 3 may be implemented by a camera, a video recorder or the like.

The storage device 4 may be implemented by random access memory (RAM), double data rate synchronous dynamic random access memory (DDR SDRAM), read only memory (ROM), programmable ROM (PROM), flash memory, a hard disk drive (HDD), a solid state disk (SSD), electrically-erasable programmable read-only memory (EEPROM) or any other volatile/non-volatile memory devices, but is not limited thereto. The storage device 4 stores a predetermined path. The predetermined path includes a sequence of way points. The storage device 4 further stores the identification code and a robot area. The identification code corresponds to the identifying image on the robot, and is a numerical value. The robot area is an area occupied by the robot. It is worth to note that in this embodiment, the robot areas respectively of the robots are identical.

The processor 5 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

Figure 2:
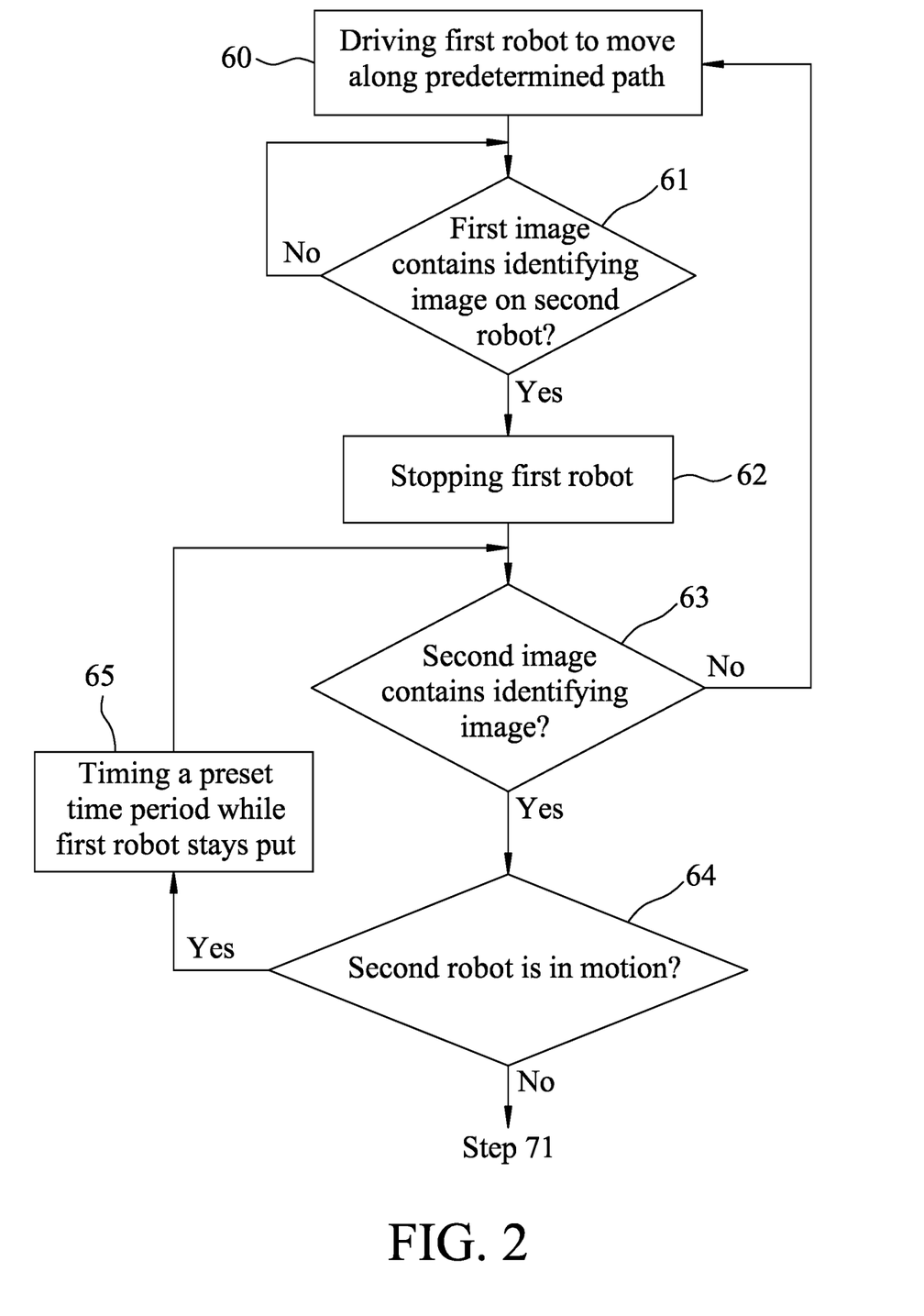
FIGS. 2 and 3 are flow charts cooperatively illustrating a method for preventing the robot from colliding with another robot according to an embodiment of the disclosure.
Figure 3:
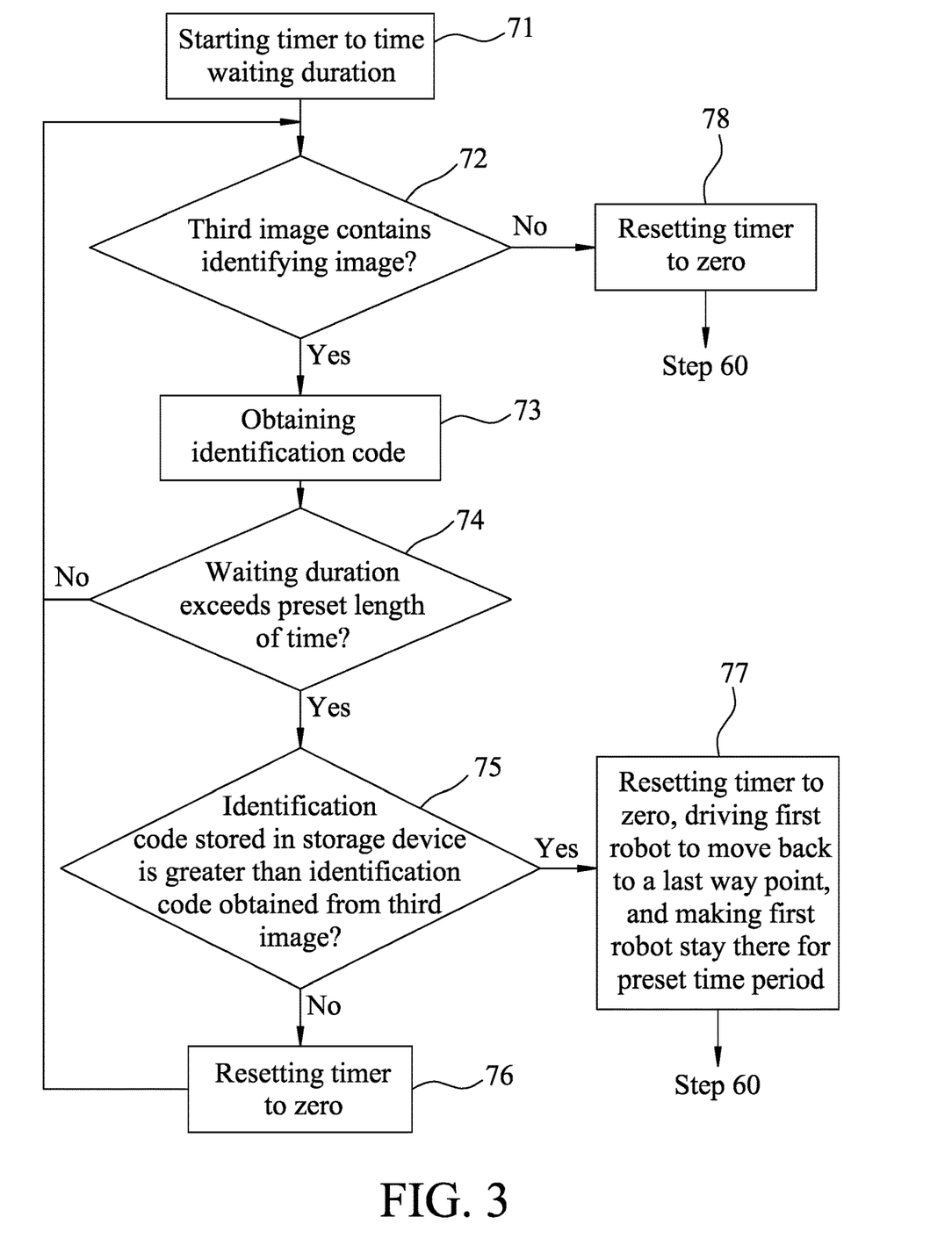

Referring to FIGS. 2 and 3, the method according to an embodiment of the disclosure is illustrated. In this embodiment, the robot is a robotic lawn mower. The method includes a pre-stage procedure and a post-stage procedure. The pre-stage procedure includes steps 60 to 65 delineated below. It should be noted that since each of the robots is configured to implement the method in a similar way, the following description of the method will be made from the perspective of one of the robots (hereinafter referred to as "first robot") for clarity of explanation.

In step 60, the processor 5 controls the driving device 2 to drive the first robot to move along the predetermined path, and performs a specific task (e.g., controls the mowing device 9 to perform lawn mowing) at the same time.

In step 61, while the first robot is moving, the processor 5 controls the image capturing device 3 to capture a first image, and determines whether the first image that is currently captured by the image capturing device 3 contains an identifying image on another one of the robots (hereinafter referred to as "second robot"). When it is determined that the first image contains no identifying image, the flow of the method goes back to step 61 (i.e., step 61 is repeated). Otherwise, when it is determined that the first image contains the identifying image on the second robot, the flow proceeds to step 62.

In step 62, the processor 5 controls the driving device 2 to stop the first robot, and stops performing the specific task (i.e., controls the mowing device 9 to stop lawn-mowing).

In step 63, the processor 5 controls the image capturing device 3 to capture a second image, and determines whether the second image that is currently captured by the image capturing device 3 contains the identifying image on the second robot. When it is determined that the second image contains the identifying image on the second robot, the flow proceeds to step 64. Otherwise, the flow returns to step 60 for controlling the driving device 2 and the mowing device 9 to drive the first robot to resume moving along the predetermined path while performing the specific task (i.e., lawn-mowing).

It is worth to note that in one embodiment, when it is determined that the second image contains the identifying image on the second robot, the flow directly proceeds to the post-stage procedure (i.e., steps 64 and 65 are omitted).

In step 64, the processor 5 determines whether the second robot is in motion (including moving, rotating and spinning in place) based on the second image (hereinafter referred to as "new image") that is currently captured by the image capturing device 3 and another image (hereinafter referred to as "old image") that was captured by the image capturing device 3 immediately before the second image and that has the identifying image on the second robot therein. When it is determined that the second robot is in motion, the flow proceeds to step 65. Otherwise, the flow proceeds to the post-stage procedure.

Specifically, in some embodiments where the identifying image is implemented by the linear barcode, the matrix barcode or the pattern of the identification code, the processor 5 compares positions of the identifying image respectively in the new image and the old image so as to determine whether the second robot is in motion. When the positions of the identifying image respectively in the new image and the old image are different, the processor 5 determines that the second robot is in motion. When the positions of the identifying image respectively in the new image and the old image are the same, the processor 5 determines that the second robot is not in motion.

In some embodiments where the identifying image is implemented by the ArUco marker or the AprilTag, the processor 5 performs camera pose estimation on the identifying image contained in the new image to obtain position information that is related to a current position of the second robot relative to the first robot (hereinafter referred to as "new position information"), and performs camera pose estimation on the identifying image contained in the old image to obtain position information that is related to a previous position of the second robot relative to the robot (hereinafter referred to as "old position information"). Thereafter, the processor 5 compares the new position information and the old position information so as to determine whether the second robot is in motion. When the new position information and the old position information are different, the processor 5 determines that the second robot is in motion. When the new position information and the old position information are the same, the processor 5 determines that the second robot is not in motion. It is worth noting that the new position information and the old position information are each represented by a spatial coordinate set (e.g., a 3-tuple (x, y, z) where x, y and z are real numbers) in a Cartesian coordinate system, wherein a position of the first robot serves as the origin of the Cartesian coordinate system. It should be noted that the camera pose estimation is realized by calling, in a software or firmware program, functions provided by a corresponding one of an ArUco library and an AprilTag library. Since the ArUco library and the AprilTag library have been well known to one skilled in the relevant art, detailed explanation of the same is omitted herein for the sake of brevity.

In step 65, the processor 5 times a preset time period (e.g., three seconds) while the first robot stays put (stays at its current location). Then, after the preset time period has elapsed, the procedure flow returns to step 63. It should be noted that, for the first execution of step 64, the new image is the second image captured in step 63, and the old image is the first image captured in step 61; when step 64 is executed again, the new image is the second image that is newly captured in the second execution of step 63, and the old image is the second image that was captured immediately before the new image (i.e., the second image captured in the first execution of step 63).

The post-stage procedure includes steps 71 to 78 delineated below.

In step 71, the processor 5 starts a timer to time a waiting duration for which the first robot stops moving. It should be noted that the processor 5 starts the timer to time the waiting duration only when it is determined that the second robot is not in motion.

After controlling the driving device 2 to stop the first robot, in step 72, the processor 5 controls the image capturing device 3 to capture a third image, and determines whether the third image that is currently captured by the image capturing device 3 contains the identifying image on the second robot. When it is determined that the third image does not contain the identifying image on the second robot, the flow proceeds to step 78. Otherwise, when it is determined that the third image contains the identifying image on the second robot, the flow proceeds to step 73.

In step 73, the processor 5 further processes the third image to obtain an identification code that corresponds to the identifying image on the second robot. Then, the procedure flow proceeds to step 74.

Specifically, in some embodiments where the identifying image is implemented by the pattern of the identification code, the processor 5 performs optical character recognition (OCR) on the identifying image in the third image so as to obtain the identification code. Since implementation of the OCR has been well known to one skilled in the relevant art, detailed explanation of the same is omitted herein for the sake of brevity.

In some embodiments where the identifying image is implemented by the linear barcode or the matrix barcode, the processor 5 scans the identifying image in the third image, and decodes the identifying image to obtain the identification code. Since implementations of barcode scanning and identification have been well known to one skilled in the relevant art, detailed explanation of the same is omitted herein for the sake of brevity.

In some embodiments where the identifying image is implemented by the ArUco marker or the AprilTag, the processor 5 executes a software or firmware program, where a function that is related to identification of a corresponding one of the ArUco marker and the AprilTag and that is provided by a corresponding one of the ArUco library and the AprilTag library is called, so as to obtain the identification code.

In step 74, the processor 5 determines whether the waiting duration has exceeded a preset length of time (e.g., 30 seconds). When it is determined that the waiting duration has not exceeded the preset length of time, the flow returns to step 72. Oppositely, when it is determined that the waiting duration has exceeded the preset length of time, the flow proceeds to step 75.

In step 75, the processor 5 determines whether the identification code stored in the storage device 4 is greater than the identification code obtained from the third image. When it is determined that the identification code stored in the storage device 4 is not greater than the identification code obtained from the third image, the flow proceeds to step 76. On the other hand, when it is determined that the identification code stored in the storage device 4 is greater than the identification code obtained from the third image, the flow proceeds to step 77.

In alternative embodiments, the processor 5 determines whether the identification code stored in the storage device 4 is smaller than the identification code obtained from the third image in step 75. When it is determined that the identification code stored in the storage device 4 is not smaller than the identification code obtained from the third image, the flow proceeds to step 76. When it is determined that the identification code stored in the storage device 4 is smaller than the identification code obtained from the third image, the flow proceeds to step 77.

In step 76, the processor 5 resets the timer to zero, and the flow returns to step 72.

In step 77, the processor 5 resets the timer to zero. In addition, the processor 5 controls the driving device 2 to drive the first robot to move back to a last one of the way points that is immediately before a current one of the way points where the first robot is currently located, and controls the driving device 2 to make the first robot stay at the last one of the way points for a preset time period. When the preset time period has elapsed, the flow returns to the pre-stage procedure, and the processor 5 controls the driving device 2 to drive the first robot to resume moving along the predetermined path. The preset time period is exemplarily 30 seconds, but is not limited to such and may vary in other embodiments.

When it is determined that the third image does not contain the identifying image on the second robot, in step 78, the processor 5 resets the timer to zero, and the flow returns to the pre-stage procedure where the processor 5 controls the driving device 2 to drive the first robot to resume moving along the predetermined path.

In some embodiments where the identifying image is implemented by the ArUco marker or the AprilTag, the processor 5, in step 73, further performs camera pose estimation on the identifying image contained in the third image to obtain position information that is related to a position of the second robot relative to the first robot. The position information is represented by a spatial coordinate set in the Cartesian coordinate system, wherein the position of the first robot serves as the origin of the Cartesian coordinate system.

Figure 4:
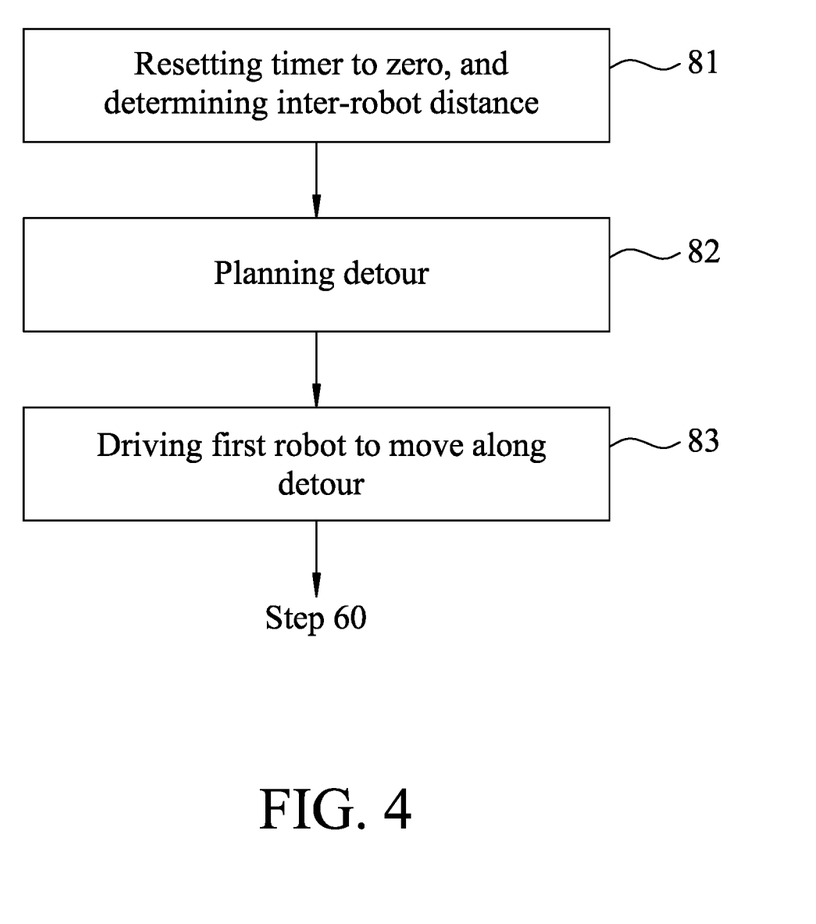
FIG. 4 is a flow chart illustrating an obstacle-detouring procedure of the method according to an embodiment of the disclosure.

In other embodiments, when it is determined in step 75 that the identification code stored in the storage device 4 is greater than the identification code obtained from the third image, instead of proceeding to step 77 to avoid colliding with the second robot by moving back to the previous way point, the flow proceeds to an obstacle-detouring procedure as shown in FIG. 4 to avoid colliding into the second robot by taking a detour. The obstacle-detouring procedure includes steps 81 to 83 delineated below.

In step 81, the processor 5 resets the timer to zero. In addition, the processor 5 determines an inter-robot distance between the first robot and the second robot by calculating an Euclidean distance based on the position information obtained in step 73.

In step 82, the processor 5 plans a detour from the current one of the way points where the first robot is currently located by using an obstacle avoidance algorithm based on the inter-robot distance, the robot area of the second robot, and a next one of the way points that is immediately next to the current one of the way points. The obstacle avoidance algorithm is exemplarily one of Bug algorithms. Since Bug algorithms have been well known to one skilled in the relevant art, detailed explanation of the same is omitted herein for the sake of brevity.

In step 83, the processor 5 controls the driving device 2 to drive the first robot to move along the detour to arrive at the next one of the way points of the predetermined path. Afterwards, the procedure flow returns to the pre-stage procedure, and the processor 5 controls the driving device 2 to drive the first robot to resume moving along the predetermined path.

It should be noted that when the first robot is moving along the detour and encounters a third robot, the pre-stage procedure and the obstacle-detouring procedure may be executed at the same time so as to make the first robot avoid colliding with the third robot.

To sum up, for the method according to the disclosure, each robot is provided with an identifying image associated with a unique identification code, and is prevented from colliding with another robot by making a determination as to whether an image captured by the robot contains the identifying image of said another robot. The robot stops moving when it is determined that the image contains the identifying image of said another robot, and further makes another determination as to whether said another robot is not in motion. The robot would stay at its current location and wait until said another robot leaves before moving again (i.e., when it is determined that said another robot is in motion). On the other hand, when it is determined that said another robot is not in motion, the robot may return to a last one of way points of the predetermined path or take a detour according to a result of identification code comparison. In this way, collisions occurring among robots may be effectively prevented in time, and quality of work (e.g., lawn mowing or floor cleaning) performed by the robots may be improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for preventing a robot from colliding with another robot, said another robot being provided with an identifying image, the robot including a driving device for driving the robot to move, an image capturing device, a storage device that stores a predetermined path, and a processor that is electrically connected to the driving device, the image capturing device and the storage device, the identifying image on said another robot being associated with an identification code that is unique to said another robot and that is a numerical value, the robot being provided with another identifying image associated with another identification code that is unique to the robot and that is a numerical value, the storage device further storing the another identification code that corresponds to the another identifying image on the robot, the method to be implemented by the processor and comprising steps of:

controlling the driving device to drive the robot to move along the predetermined path;
while the robot is moving, controlling the image capturing device to capture a first image and determining whether the first image that is currently captured by the image capturing device contains the identifying image on said another robot;
when it is determined that the first image contains the identifying image, controlling the driving device to stop the robot;
after controlling the driving device to stop the robot, controlling the image capturing device to capture a second image and determining whether the second image that is currently captured by the image capturing device contains the identifying image;
when it is determined that the second image does not contain the identifying image, controlling the driving device to drive the robot to resume moving along the predetermined path;
between controlling the driving device to stop the robot and controlling the image capturing device to capture a second image, starting a timer to time a waiting duration for which the robot stops moving;
when it is determined that the second image does not contain the identifying image, resetting the timer to zero;
when it is determined that the second image contains the identifying image, determining whether the waiting duration has exceeded a preset length of time;
when it is determined that the waiting duration has not exceeded the preset length of time, returning to the step of controlling the image capturing device to capture a second image and determining whether the second image that is newly captured by the image capturing device contains the identifying image on said another robot;
when it is determined that the second image contains the identifying image on said another robot, further processing the second image to obtain the identification code that corresponds to the identifying image on said another robot;
determining whether the identification code stored in the storage device is greater than the identification code obtained from the second image; and
when it is determined that the another identification code stored in the storage device is not greater than the identification code obtained from the second image, resetting the timer to zero and returning to the step of controlling the image capturing device to capture a second image and determining whether the second image that is newly captured by the image capturing device contains the identifying image on said another robot.

2. The method as claimed in claim 1, the predetermined path including a sequence of way points, the method further comprising steps of, when it is determined that the another identification code stored in the storage device is greater than the identification code obtained from the second image:

resetting the timer to zero;
controlling the driving device to drive the robot to move back to a last one of the way points that is immediately before a current one of the way points where the robot is currently located;
controlling the driving device to make the robot stay at the last one of the way points for a preset time period; and
controlling the driving device to drive the robot to resume moving along the predetermined path when the preset time period has elapsed.

3. The method as claimed in claim 1, the predetermined path including a sequence of way points, the storage device further storing a robot area that is an area occupied by said another robot, the method further comprising a step of:

performing camera pose estimation on the identifying image contained in the second image to obtain position information that is related to a position of said another robot with respect to the robot;

wherein after resetting the timer to zero, when it is determined that the another identification code stored in the storage device is not greater than the identification code obtained from the second image, the method further comprises steps of:

determining an inter-robot distance between the robot and said another robot based on the position information;

planning a detour from a current one of the way points where the robot is currently located by using an obstacle avoidance algorithm based on the inter-robot distance, the robot area, and a next one of the way points that is immediately next to the current one of the way points; and controlling the driving device to drive the robot to move along the detour.

4. A method for preventing a robot from colliding with another robot, said another robot being provided with an identifying image, the robot including a driving device for driving the robot to move, an image capturing device, a storage device that stores a predetermined path, and a processor that is electrically connected to the driving device, the image capturing device and the storage device, the method to be implemented by the processor and comprising steps of:

controlling the driving device to drive the robot to move along the predetermined path;

while the robot is moving, controlling the image capturing device to capture a first image and determining whether the first image that is currently captured by the image capturing device contains the identifying image on said another robot;

when it is determined that the first image contains the identifying image, controlling the driving device to stop the robot;

after controlling the driving device to stop the robot, controlling the image capturing device to capture a second image and determining whether the second image that is currently captured by the image capturing device contains the identifying image;

when it is determined that the second image does not contain the identifying image, controlling the driving device to drive the robot to resume moving along the predetermined path;

between controlling the driving device to stop the robot and controlling the image capturing device to capture a second image, starting a timer to time a waiting duration for which the robot stops moving; and when it is determined that the second image does not contain the identifying image, resetting the timer to zero, the method further comprising steps, between the step of controlling the driving device to stop the robot and the step of starting a timer to time a waiting duration, of:

controlling the image capturing device to capture a third image and determining whether the third image that is currently captured by the image capturing device contains the identifying image;

determining whether said another robot is in motion based on the third image that is currently captured by the image capturing device and another image that was captured by the image capturing device immediately before the third image and that contains the identifying image; and starting the timer to time the waiting duration only when it is determined that said another robot is not in motion.

5. The method as claimed in claim 4, further comprising a step of:

when it is determined that said another robot is in motion, controlling the driving device to make the robot stay put for a preset time period, and returning to the step of controlling the image capturing device to capture a third image and determining whether the third image that is currently captured by the image capturing device contains the identifying image.

6. The method as claimed in claim 1, further comprising a step of:

when it is determined that the first image does not contain the identifying image, returning to the step of controlling the image capturing device to capture a first image and determining whether the first image that is newly captured by the image capturing device contains the identifying image on said another robot.

7. The method as claimed in claim 4, further comprising a step of:

when it is determined that the first image does not contain the identifying image, returning to the step of controlling the image capturing device to capture a first image and determining whether the first image that is newly captured by the image capturing device contains the identifying image on said another robot.

* * * * *